Sept. 20, 1927.
W. E. WHIPP
1,642,863
HEADSTOCK FOR LATHES
Original Filed Oct. 27, 1924
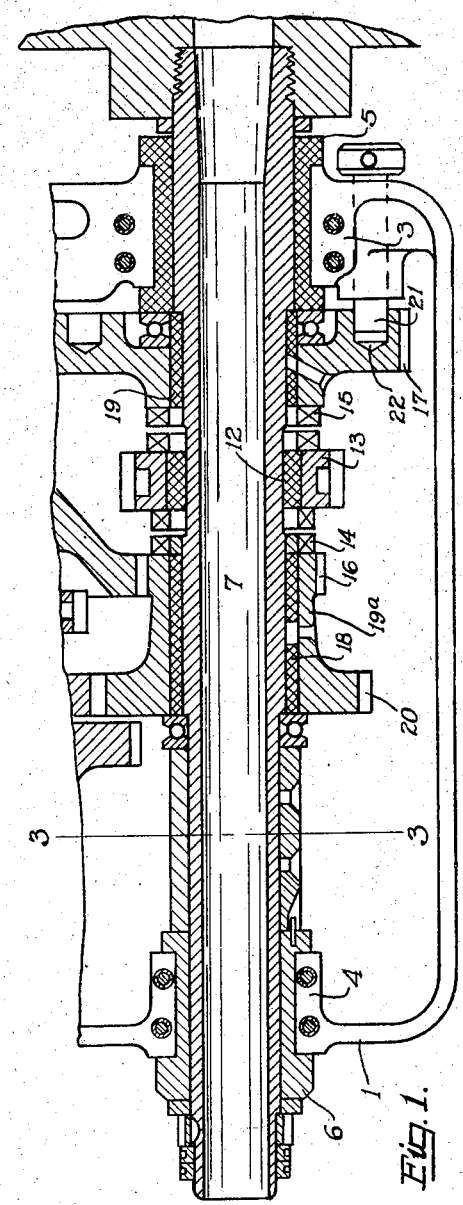
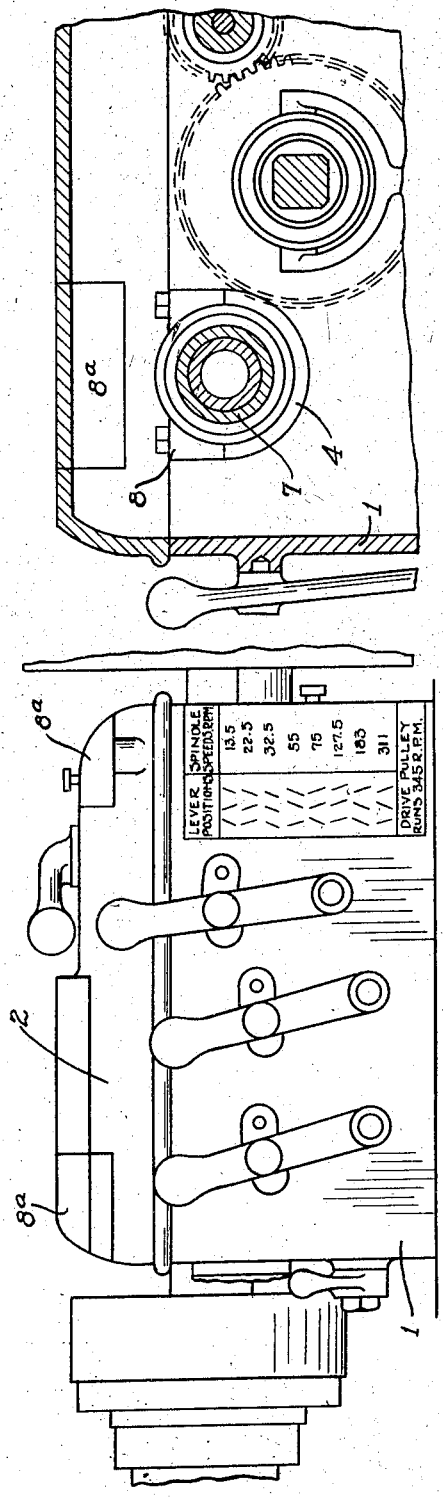

Patented Sept. 20, 1927.

1,642,863

UNITED STATES PATENT OFFICE.

WENDELL E. WHIPP, OF SIDNEY, OHIO, ASSIGNOR TO THE MONARCH MACHINE TOOL COMPANY, OF SIDNEY, OHIO, A CORPORATION OF OHIO.

HEADSTOCK FOR LATHES.

Original application filed October 27, 1924, Serial No. 746,005. Divided and this application filed April 6, 1925. Serial No. 20,989.

This invention relates to new and useful improvements in headstocks for lathes, and is a division of my application, Serial No. 746,005, filed October 27th, 1924.

It is the principal object of this invention to mount the spindle bearings in the headstock, where they are completely enclosed and protected from dust and dirt. All objectionable overhang is thereby eliminated.

It is another object of my invention to provide in the headstock cover plate, handplates which may be readily removed to permit an easy adjustment of the spindle bearings.

In the accompanying drawings illustrating my invention, Figure 1 is a longitudinal, sectional view taken through the center of the spindle of my improved lathe headstock. Figure 2 is a side view of the latter. And Figure 3 is a cross sectional view taken on the line 3—3 of Figure 1.

Referring to the accompanying drawings for a detailed description of my invention, the numeral 1 designates a headstock casing which is preferably of the bowl type to give exceptional strength and rigidity. This headstock casing is provided with a cover plate 2 beneath which, within the casing and forming portions thereof, are bosses 3 and 4 which provide seats for journal bearings 5 and 6 respectively for a spindle 7 of the usual engine lathe type. The spindle bearings are thus brought within the headstock casing by these bosses 3 and 4 to eliminate the objectionable overhang and to protect the bearings from dust and dirt.

To the bosses 3 and 4, which have caps 8, easy access may be had for oiling and the adjustment of screws, through removable hand plates 8ª in the cover plate 2. (See Figures 2 and 3.) These hand plates 8ª permit access to the journal bearings for oiling and the adjustment of cap screws without the necessity of removing the cover plate 2.

Splined to the spindle 7 by means of squared portions 12 thereon, is a clutch member 13 of the double jaw type. This clutch member 13 is adapted to clutch the spindle to either one of two clutch members 14 and 15 secured to gears 16 and 17 respectively that are preferably of the helical type. These gears are journaled for a free movement on the spindle by the aid of bronze bushings 18 and 19.

The gear 16 is formed on a sleeve 19ª on which there is also formed a larger gear 20 that is preferably of the helical type. When the clutch member 13 is moved to the right as shown in Figure 1, the spindle 7 will be driven from the gear 17; but when moved to the left, the spindle will be driven from either the gear 16 or the gear 20. (See Figure 1.)

The casing 1 is provided with a sliding pin 21 adapted to enter a pocket 22 in the gear 17 to prevent its rotation when desired.

The spindle bearing bosses 3 and 4 project inwardly from the side walls of the casing to support the bearings 5 and 6 in such a manner as to eliminate overhang. These bearings have flanged ends which project around the ends of the bosses to aid in firmly anchoring the bearings in the bosses and to assist in preventing the entrance of dust and dirt to them.

Having described my invention, I claim:

1. A headstock for lathes, comprising a casing, a spindle therein, means for driving the spindle, bosses formed on the side walls of the casing and extending inwardly therefrom, flanged journal bearings fitted to said bosses within the casing, and removable cover means directly over said bosses to permit ready access to the bearings.

2. A headstock for lathes, comprising a casing, a spindle therein, means for driving the spindle provided within the casing, a cover plate for the casing, and removable portions within said cover plate over the bearings.

3. A headstock for lathes, comprising a casing, a spindle therein, means for driving the spindle, bearing bosses formed within the casing, journal bearings for the spindle mounted within said bosses, and removable hand plates in the cover plate over said journal bearings.

In witness whereof I have hereunto set my hand this 3d day of April, 1925.

WENDELL E. WHIPP.